United States Patent [19]

Yamaura et al.

[11] 4,028,510

[45] June 7, 1977

[54] SAFETY DEVICE ACTUATABLE BY SEISMIC VIBRATIONS

[75] Inventors: Yoshitomo Yamaura, Nagano; Takayoshi Kobayashi, Tokyo; Akira Asanuma; Kuichiro Miyazawa, both of Nagano, all of Japan

[73] Assignee: Kabushiki Kaisha Shinko Seisakusho, Nagano, Japan

[22] Filed: Aug. 22, 1975

[21] Appl. No.: 607,045

[30] Foreign Application Priority Data

Aug. 24, 1974 Japan .............................. 49-97272
Oct. 25, 1974 Japan ............................ 49-123222

[52] U.S. Cl. ...................... 200/61.45 R; 200/61.5
[51] Int. Cl.² ...................................... H01H 35/14
[58] Field of Search ................ 200/61.45, 61.53; 73/70 R, 71.7, 560, 510–512, 517 R, 535–551

[56] References Cited

UNITED STATES PATENTS

| 2,949,783 | 8/1960 | Butler | 200/61.45 R X |
| 3,001,039 | 9/1961 | Johnson | 200/61.45 R |
| 3,560,681 | 2/1971 | Webber | 200/61.45 R |
| 3,588,400 | 6/1971 | Fanes | 200/61.45 R |
| 3,626,764 | 12/1971 | Prachar | 200/61.45 R X |
| 3,703,102 | 11/1972 | Prachar | 200/61.45 R X |

Primary Examiner—James R. Scott

[57] ABSTRACT

An apparatus actuated by seismic vibrations and other vibrations is disclosed.

A vertically or substantially vertically movable rod, a weight or mass in engagement or capable of engagement with the rod and a plurality of pivotable stays or support arms supporting the weight are provided within a housing, and held in a mechanically balanced state in their entirety. When the apparatus undergoes seismic or other vibrations, the mechanical balance is disturbed, whereupon the weight is released from the support arms and allowed to fall together with the vertically movable rod due to the gravitational force, thereby effecting the switching of a related fluid or electric circuit.

5 Claims, 9 Drawing Figures

SAFETY DEVICE ACTUATABLE BY SEISMIC VIBRATIONS

BACKGROUND OF THE INVENTION

This invention relates to a apparatus actuated by vibratory energy, such as seismic energy to switch related fluid or electric circuits and, more particularly, to an apparatus normally held in a mechanically balanced state and actuated when the mechanical balance is disturbed or upset by vibratory energy in excess of a predetermined magnitude.

Earthquake and similar vibratory phenomena are liable to cause braking of fluid pipe lines for petroleum and gases, break the grounding or interrupt electric transmission lines, thus giving rise to secondary hazards such as explosions, fires and electric lightning.

Accordingly, switching means for automatically closing or opening, a related circuit in response to vibrations above a predetermined magnitude, and which can be manually reset to the initial state for restoring a related circuit function, has been desired. Also, such a device should preferably be compact in construction and provide a long service life.

Heretofore, various types of such devices have been developed. However, those utilizing electricity or magnetism encounter difficulties in use, in view of power stoppage caused at the time of an earthquake, so that such changes and any deterioration in power service are likely to lead to operation failure at the time of an emergency and may also come difficulties relating to inspection and maintenance. Therefore their use is limited to special cases. There have also been developed various mechanical switching means for the same reasons, and these include a device which utilizes a ball placed on a horizontal surface and is adapted to roll and/or fall at the time of an earthquake, thereby closing a related circuit, and another device which utilizes a bar placed vertically on a horizontal surface and capable of being comparatively readily upset by falling down at the time of an earthquake to close a related circuit.

Although these mechanical switching means have been generally well known, they have inherent drawbacks. Firstly, they are not sufficiently sensitive to vertical vibrations, though they can respond well to horizontal vibrations. Secondly, they are liable to be actuated when they are tilted by causes other than earthquakes. Thirdly, they do not respond to vibratory acceleration. This means that they cannot ensure reliable actuation by vibrations of energy above a predetermined magnitude, and that their response time fluctuates. Fourthly, their output is not sufficiently large, and efforts to increase their output have led to increased size and weight of the whole structure due to increased weight of the ball, or bar and also due to a complicated construction.

OBJECT OF THE INVENTION

It is accordingly an object of the present invention to provide a switching apparatus actuated by vibrations, which is equally sensitive to both horizontal and vertical vibrations.

Another object of the invention is to provide a switching apparatus, which is not easily actuated even when tilted by causes other than seismic vibrations.

A further object of the invention is to provide a switching apparatus, which responds to vibratory acceleration and is reliably actuated by vibrations of vibratory energy above a predetermined magnitude, and whose response time is constant.

A still further object of the present invention is to provide a switching apparatus which is small in size and light in weight, which can produce a large output, and which is simple in mechanical construction and inexpensive.

BRIEF DESCRIPTION OF THE DRAWING

The above and other objects, features and uses of the present invention will become more apparent from the description of some of the preferred embodiments of the invention, when the same is used with reference to the accompanying drawings, in which.

DETAILED DESCRIPTION OF THE INVENTION

Figure 1:
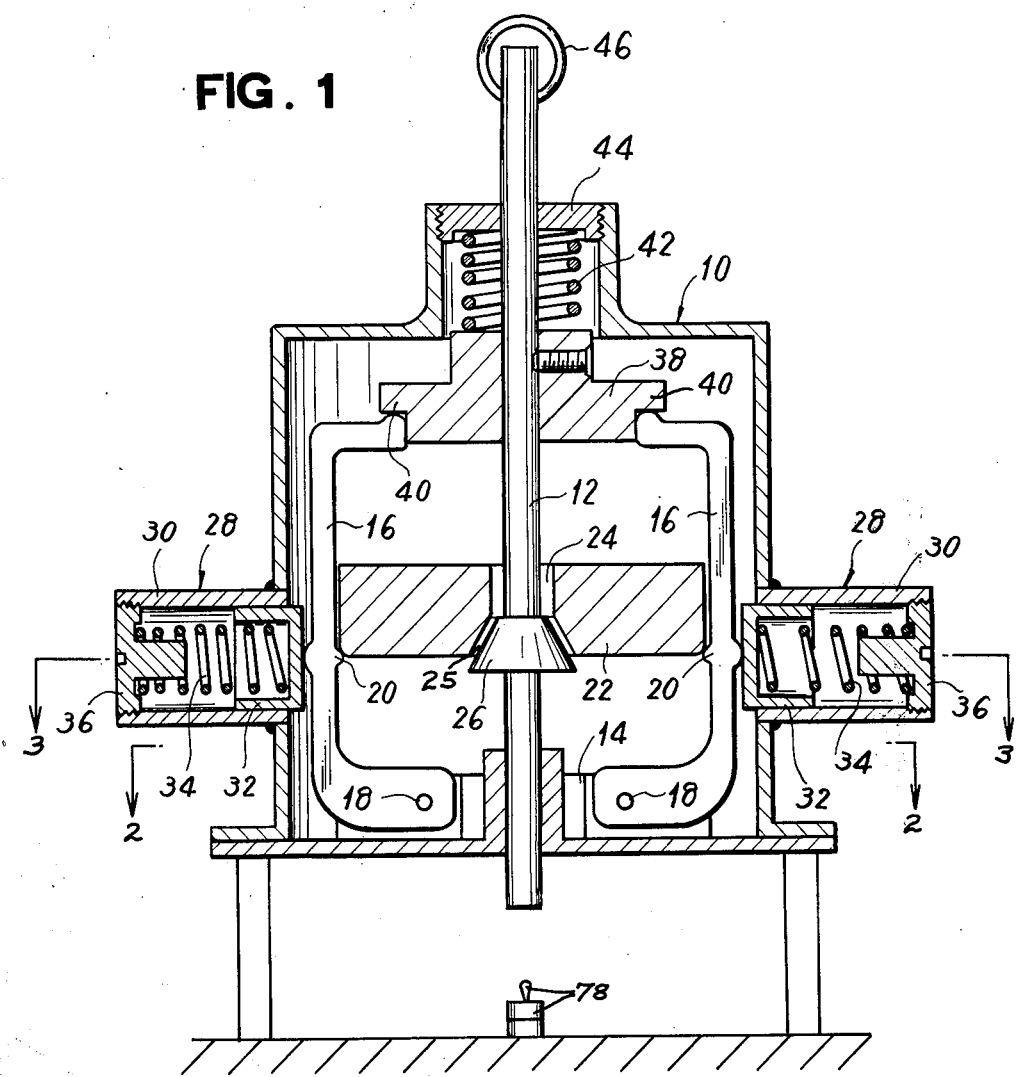
FIG. 1 is an axial sectional view of an embodiment of the apparatus, according to the present invention.
Figure 2:
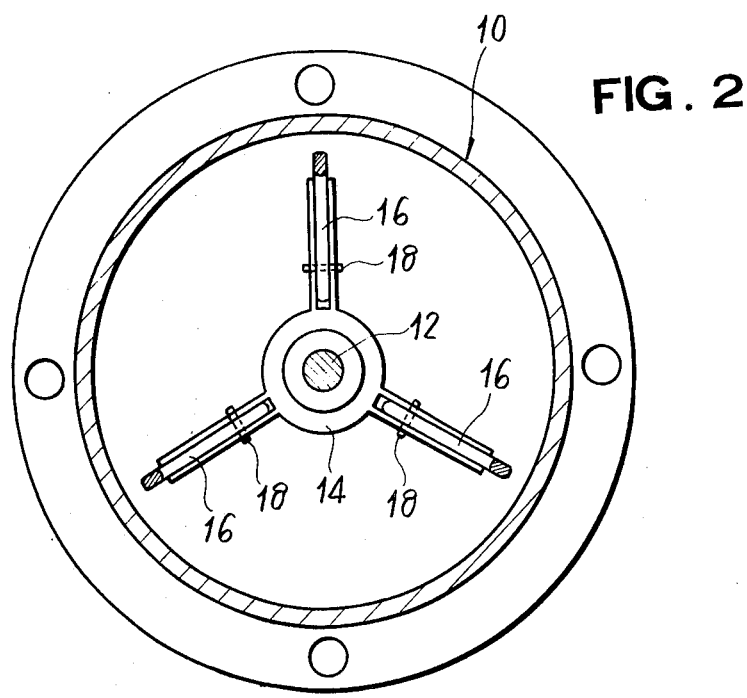
FIG. 2 is a section taken along line 2—2 of FIG. 1.
Figure 3:
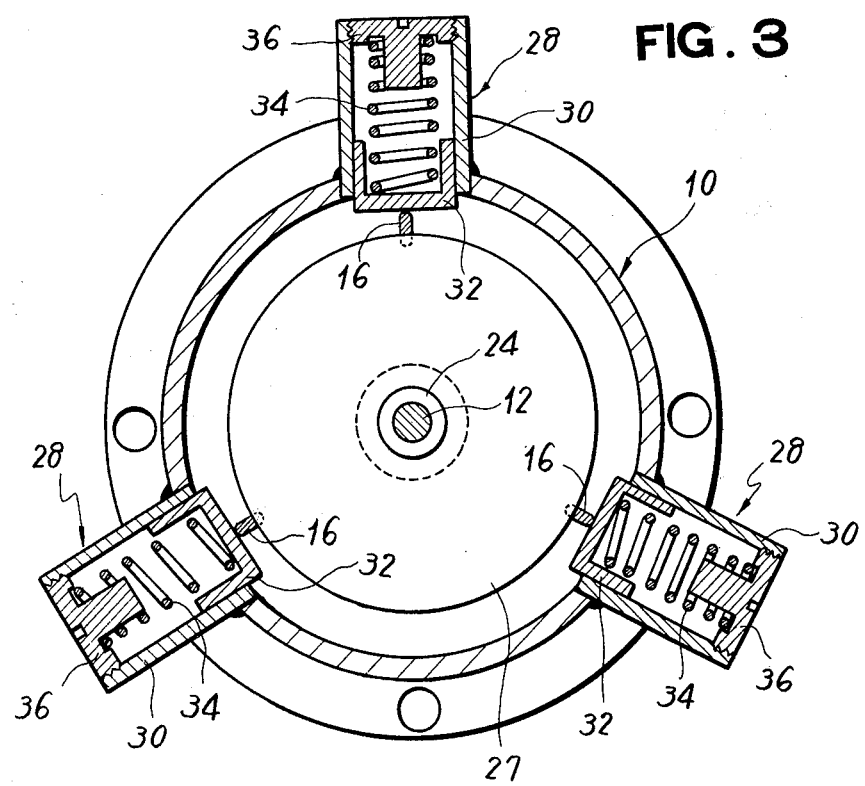
FIG. 3 is a section taken along line 3—3 of FIG. 1.

Referring now to FIG. 1, there is shown a first embodiment of the apparatus actuated by vibrations. A vertically or substantially vertically movable rod 12 penetrates a coaxial cylindrical housing 10. The lower end of the rod 12 is provided with a non-illustrated microswitch or a valve, or may operate an external microswitch or valve 78. A stay mount 14 concentric with the rod 12, as most clearly shown in FIG. 2, is secured to the bottom of the housing 10. Three stays 16 radially spaced apart at a uniform angular intervals of 120° with respect to the axis of the stay mount 14 are pivoted thereto by respective pins 18. These stays 16 are provided at their intermediate position with respective inner protuberances 20 best seen in FIG. 1. A weight 22 is supported at three points on its outer periphery by upper portions of the individual protuberances 20. The weight 22 has a central through bore 24 penetrated by the rod 12. The bore 24 has a downwardly flaring lower portion 25. A weight support member 26 of a conical shape extends within the bore 24 and the bore portion 25 of the weight 22 and is secured to the rod 12. When the weight 22 is released from the stays 16, it is adapted to engage a weight support member 26.

Adjustment means 28 associated with respective stays 16 are mounted on the housing 10. Each adjustment means 28 includes a sleeve 30 secured to the peripheral wall of the housing 10 at a position corresponding to the protuberance of the associated stay 16, a pusher member 32 slidably fitted in the sleeve 30, a compression spring 34 biasing the pusher member 32 toward the stay 16, and an adjustment screw screwed into the sleeve 30 at an outer opening thereof and capable of manipulation for adjusting the spring pressure. The individual stays 16 are urged inwardly by the respective pusher members 32 with the biasing force of the slide spring 34, whereby the weight 22 is held supported on the protuberances 20 of the stays 16.

Designated as 38 is a keeper member secured to an upper portion of the rod 12 and having a lower stepped portion 40. It serves to engage the upper ends of the stays 16 and regulate the inward rotation of the stays 16 urged by the pusher members 32, thereby steadily holding the weight 22 in position. A head spring 42 is provided between the keeper member 38 and the top of the housing 10, and the rod 12 is urged downwardly by the spring pressure of the head spring 42. An adjustment screw 44 is screwed to the top of the housing 10 for adjusting the spring pressure of the head spring 42. The spring pressure of the head spring 42 is greater than the sum of the spring pressures of the individual slide springs 34, and these spring pressures are mechanically balanced.

An upper end of the rod 12 extending from the top of the housing 10 is provided with a manual restoration ring 46.

The operation of the above construction will now be described. It is normally in the set state of FIG. 1. When the apparatus experiences vibrations such as seismic vibrations above a predetermined magnitude, the head spring 42 and slide spring 34 execute spring motions according to the gravitational accelerations exerted. The head spring 42 executes a spring motion having particularly axial vibrations, while the slide springs 34 execute a spring motion, having particularly with vibrations in horizontal directions. As a result of those spring motions the weight 22 is vibrated vertically and horizontally to exert an outward impact pressure onto the individual stays 16. If the impact pressure surpasses the force of friction between each stay 16 and keeper member 38, and the spring pressure of each slide spring 34, each stay 16 is released from engagement with the keeper member 38 aganist the afore-mentioned forces and is outwardly rotated about the associated pin 18. As a result, the weight 22 is released from engagement with at least one of the protuberances 20. In consequence, the weight 22 strikes the weight support member 26, and the rod 12 is forced down to a position as shown in FIG. 4 by the gravitational pull of the weight 22 and the spring force of the head spring 42, thereby effecting the switching of a valve or microswitch 78.

Figure 4:
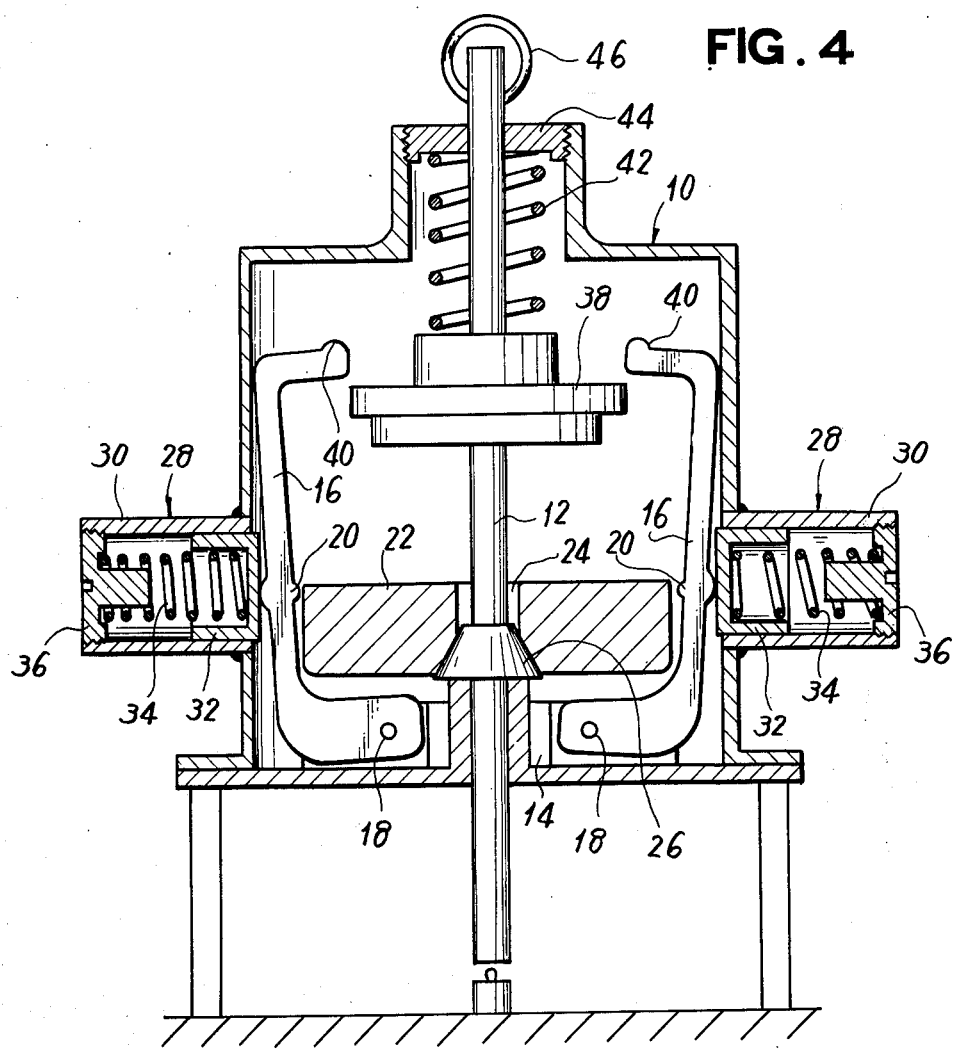
FIG. 4 is an approximate axial sectional view of the same apparatus in its actuated state.

The state shown in FIG. 1 is restored from the state shown in FIG. 4 by raising the ring 46.

The release thrust of the rod 12 is determined by the gravitational pull of the weight 22, and the spring pressure of the head spring 42, and these parameters may be appropriately selected to provide a predetermined release thrust.

Further, the apparatus may be designed to be actuated by vibrations above a suitable predetermined magnitude by appropriately selecting the mass of the weight 22, the spring pressure of the individual slide springs 34 and the head spring 42, the force of friction between the keeper member 38 and each stay 16, and the force of friction between each pusher member 32 and the associated sleeve 30.

In addition, the operative part of the apparatus is preferably made of metals or similar materials, so that the apparatus may withstand cold or hot climates, or wind, rain and snow, and provide reliable performance irrespective of its locality or environments. The housing may be made of comparatively light materials, such as aluminum or alloys thereof, or plastic materials.

The apparatus, according to the present invention, is not actuated even if it is tilted to some extent, but is actuated in response to vibratory acceleration However, it is preferably mounted on a horizontal surface and in a concealed locality.

FIGS. 5 to 8 show second and third embodiments of the apparatus, according to the present invention, where the sensitivity particularly with respect to horizontal vibrations is improved. Like parts are designated by like reference numerals, and are not repeatedly described.

Figure 5:
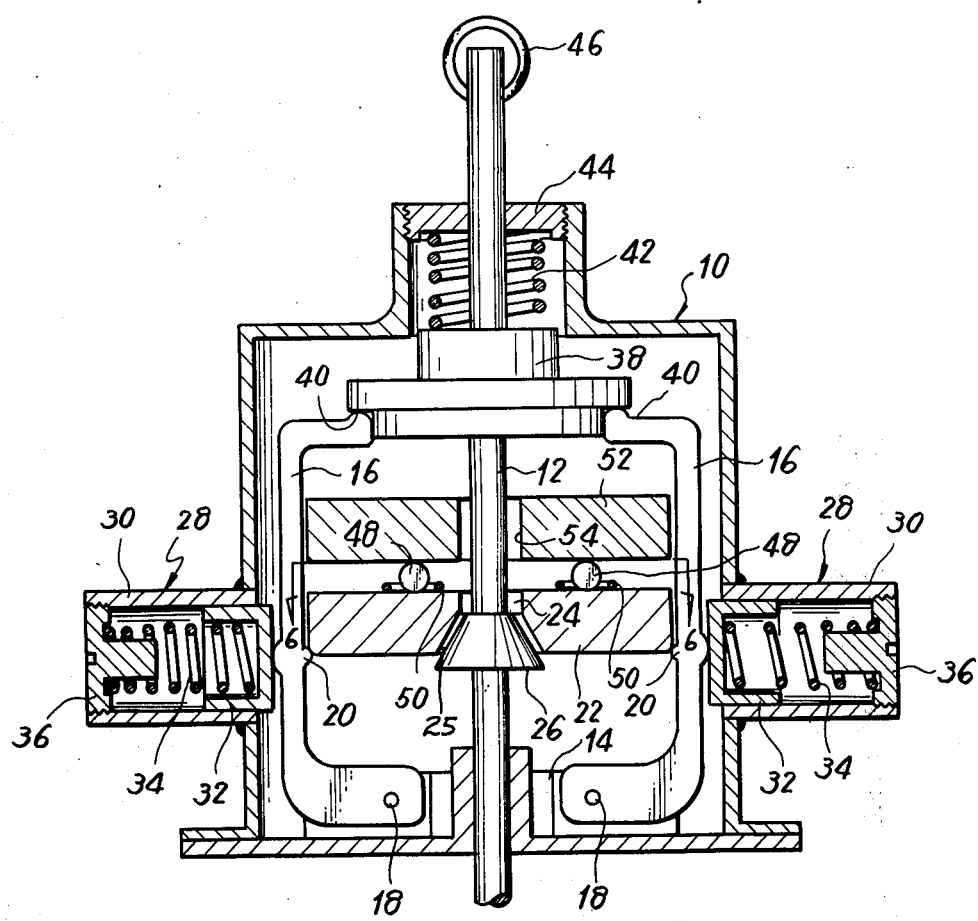
FIG. 5 is an axial sectional view showing a second embodiment of the apparatus, according to the present invention.
Figure 6:
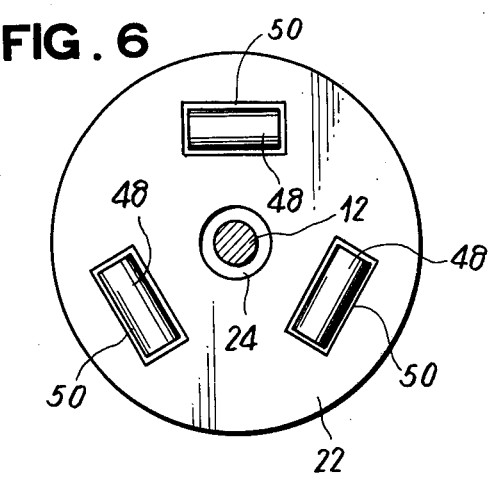
FIG. 6 is a section taken along line 6—6 of FIG. 5.

In the second embodiment shown in FIG. 5 and 6, the mass 22 carries three rollers 48 arranged on its top, and radially spaced apart at uniform angular intervals of 120°, each roller 48 being confined within an associated frame 50. A second mass 52 is freely placed on the rollers 48, its central bore 54 having an inner diameter sufficiently greater than the diameter of rod 12. With this construction, the second mass 52 is particularly sensitive to horizontal vibrations and is horizontally moved thereby to strike stays 16 and add in releasing the stays 16 from the keeper member 38, thereby causing the rod 12 to be forced down.

Figure 7:
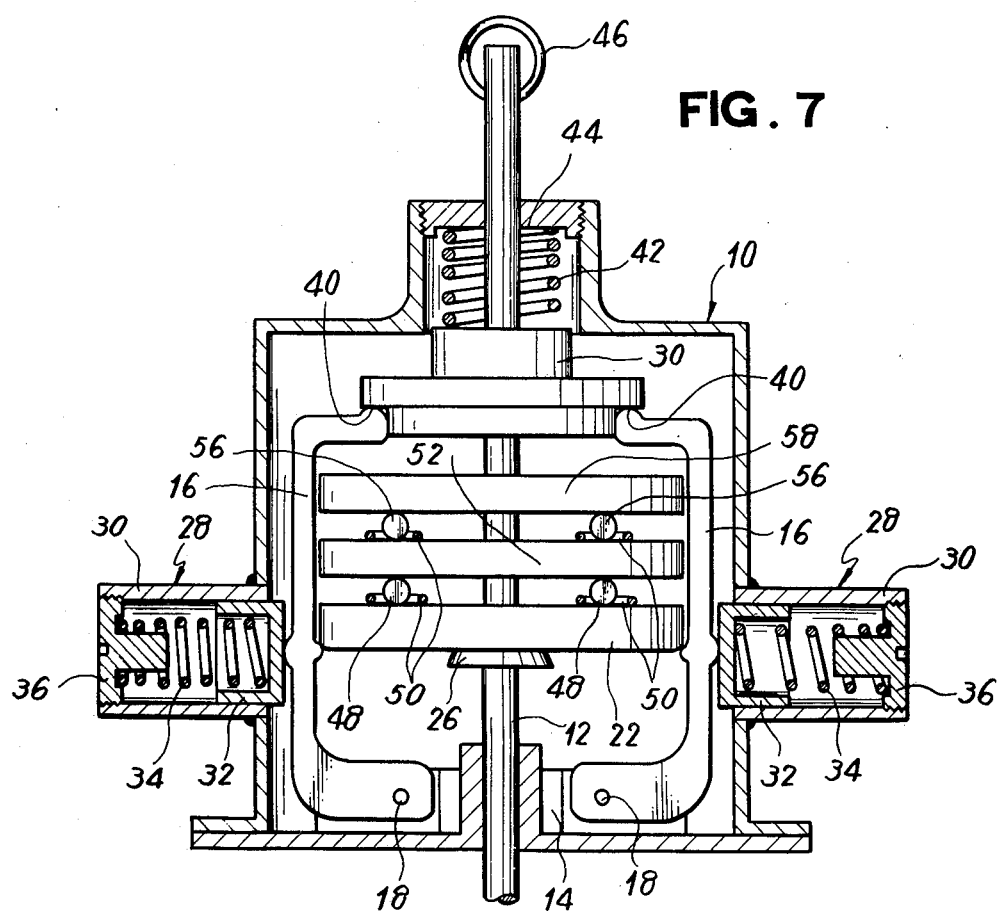
FIG. 7 is an axial sectional view showing a third embodiment of the apparatus, according to the present invention.

In the third embodiment shown in FIG. 7, the effects obtainable in the second embodiment are augmented. Here, a third mass 58 is placed on second rollers 56 carried by the second mass 52. In this case, it is possible that the third mass 58 strikes the stay 16 on the right hand side in the Figure, while the second mass 52 strikes the stay 16 on the left hand side. Also, the impact will be increased if the first mass 22 is tilted.

Figure 8:
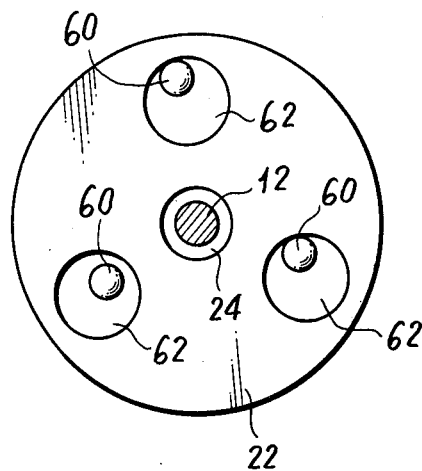
FIG. 8 is a view similar to FIG. 6, but showing a modification of the construction shown in FIG. 6.

The roller 48 and 56 in the second and third embodiments may be replaced with balls 60 as shown in FIG. 8. In this case, the individual balls 60 are retained for planetary motion within respective circular grooves 62 formed in the mass 22 or the second mass 54 and are radially spaced apart at uniform intervals of 120°. The third embodiment may further be modified by stacking additional weights or masses on top of the third weight mass 58. The number of weights or masses to be employed may be appropriately selected by measuring the correlation between the gravitational force and the sensitivity of a unit weight or mass.

Figure 9:
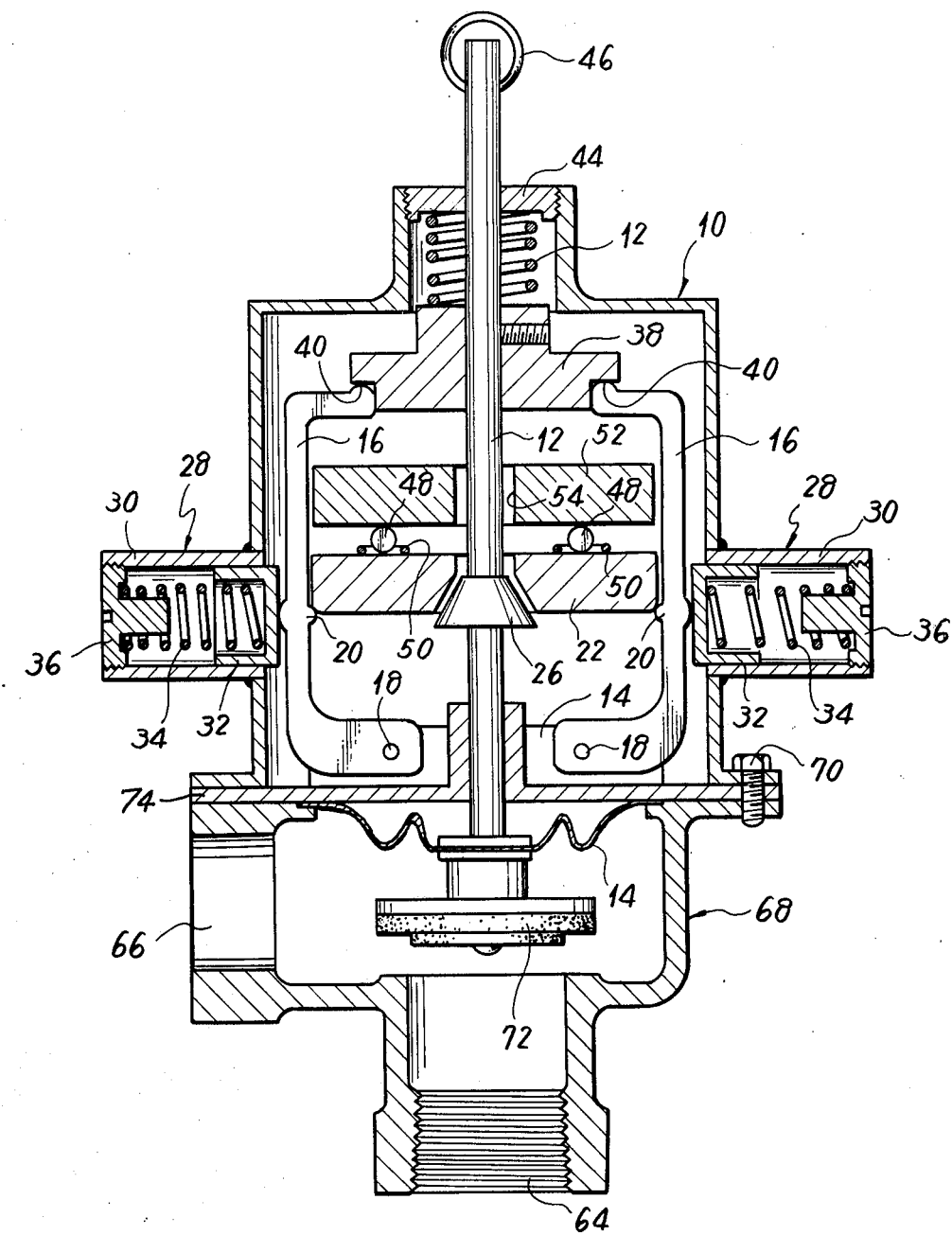
FIG. 9 is an axial sectional view showing a fourth embodiment of the apparatus, according to the present invention, applied to a valve.

FIG. 9 shows a fourth embodiment of the invention. It is actually the second embodiment of the invention applied to a valve. Here, an angle type valve 68 having perpendicular ports 64 and 66 is mounted by a bolt 70 on the underside of the housing 10. The lower end of the rod 12 extends within this valve 68 and is provided with a valve body 72 secured by not illustrated screws to the rod 12 and facing the port 64. The valve body 72 is integral with a central portion of a diaphragm 74, the edge portion of which intervenes between the valve 68 and the housing 10, and which thus hermetically isolates the interior of the housing 10 from the valve 68.

In this embodiment, when the rod is forced down in response to vibration, the valve member 72 closes the port 64 to cut-off supply of the working fluid.

While this embodiment is applied to the angle type valve, it can also be applied to valves of various other shapes and uses. Also, it is possible to arrange that the valve body opens the supply passage instead of closing it, and addition various types of valves, if necessary, may be selected.

Further, not only the application to valves, but also attachment of microswitches to the apparatus, as is well known by one skilled in the art may be employed.

While preferred embodiments, of the invention have been described in detail, it is to be understood that the invention is not limited to the above embodiments and various changes and modifications in the combination and arrangement of component parts and variations of use are possible without departing from the scope and spirit of the invention as defined by the appended claims.

What is claimed is:

1. An apparatus actuatable by seismic vibrations comprising:
    a longitudinal housing formed with a central bore and mountable on a support unit;
    a rod axially penetrating said central bore and movable from an upper position to a lower position for selectively opening and closing a switch by its vertical movement;
    first biasing means for biasing the rod downwardly;
    a keeper member secured to an upper portion of said rod in said housing;
    a plurality of stays disposed around said rod for holding said rod at the upper position against the action of said biasing means, and stays normally engaging said keeper member;
    second biasing means for biasing the stays in the direction of urging engagement of each of said stays with the keeper member;
    a weight support member attached to a lower portion of said rod in the housing; and
    a first weight having a central portion penetrable by said rod, having a lower peripheral edge supportable at the inside thereof by each of said stays, said first weight being positioned to face an upper portion of said weight support member for pushing each of said stays outwardly during vertical and horizontal vibrations of said apparatus for said rod to move downwardly to the second position upon separating said stays from said keeper member together with a drop of said weight, whereby said weight pressing on said weight support member increases the total mass of the downwardly moving rod.

2. The apparatus according to claim 1, wherein said first biasing means includes a first compression spring disposed between said keeper member and a top portion of said housing, and further comprising an adjustment screw disposed in the housing top portion for adjusting the spring pressure of said first compression spring.

3. The apparatus according to claim 1, wherein said second biasing includes a set of second compression springs, and further comprising a plurality of sleeves for receiving said second compression springs, respectively, each of said sleeves penetrating a peripheral portion of said housing and being mounted to face each of said stays, respectively, and a plurality of pushers, slidably mounted in said sleeves for contacting an external portion of each of said stays, and a plurality of externally accessible adjustment screws for adjusting the spring pressure of said second compression springs, respectively.

4. The apparatus according to claim 1, further comprising a plurality of rollable elements seated on said first weight, and at least a second weight placeable on said rollable elements, said at least second weight being slidable on said first weight for pushing each of said stays outwardly during seismic vibrations encountered by said apparatus.

5. The apparatus according to claim 1, and further comprising a manual restoration spring attached to the top end of said rod, said apparatus having initial and operating states, and being restorable to the initial state from the operating state by raising said manual-restoration-spring, whereby said stays engage with said keeper member through the pressure exerted by said second biasing means on said stays upon said keeping member being raised together with said rod, for said weight and said weight support member to re-occupy respective positions corresponding to the initial states of said apparatus.

* * * * *